US012153959B2

United States Patent
Parsa et al.

(10) Patent No.: US 12,153,959 B2
(45) Date of Patent: *Nov. 26, 2024

(54) RULE VIOLATION DETECTION

(71) Applicant: Google LLC, Mountain View, CA (US)

(72) Inventors: Arash Parsa, Mountain View, CA (US); Joshua Melcon, Mountain View, CA (US); David Gay, Mountain View, CA (US); Ryan Huebsch, Mountain View, CA (US)

(73) Assignee: Google LLC, Mountain View, CA (US)

( * ) Notice: Subject to any disclaimer, the term of this patent is extended or adjusted under 35 U.S.C. 154(b) by 219 days.

This patent is subject to a terminal disclaimer.

(21) Appl. No.: 18/049,384

(22) Filed: Oct. 25, 2022

(65) Prior Publication Data

US 2023/0076810 A1 Mar. 9, 2023

Related U.S. Application Data

(63) Continuation of application No. 16/693,556, filed on Nov. 25, 2019, now Pat. No. 11,494,229.

(51) Int. Cl.
*G06F 9/46* (2006.01)
*G06F 9/48* (2006.01)
*G06F 16/2455* (2019.01)

(52) U.S. Cl.
CPC ...... *G06F 9/4881* (2013.01); *G06F 16/24553* (2019.01)

(58) Field of Classification Search
CPC .................................................. G06F 9/4881

(Continued)

(56) References Cited

U.S. PATENT DOCUMENTS 7,437,428 B1 10/2008 Muti et al.
7,953,843 B2 5/2011 Cherkasova
(Continued)

FOREIGN PATENT DOCUMENTS

| CN | 107169009 A | 9/2017 |
|---|---|---|
| JP | 2003527800 | 9/2003 |
| JP | 2011028485 | 2/2011 |

OTHER PUBLICATIONS

Office Action for the related Chinese Application No. 202080082053.6 dated Jan. 3, 2023, 10 pages.
(Continued)

*Primary Examiner* — Mehran Kamran
(74) *Attorney, Agent, or Firm* — Honigman LLP; Brett A. Krueger

(57) ABSTRACT

A method for detecting a traffic ramp-up rule violation includes receiving data element retrieval requests from an information retrieval system and determining a requests per second (RPS) for a key range. The method also includes determining a moving average of RPS for the key range. The method also includes determining a number of delta violations, each delta violation comprising a respective beginning instance in time when the RPS exceeded a delta RPS limit. For each delta violation, the method includes determining a maximum conforming load for the key range over and determining whether the RPS exceeded the maximum conforming load for the key range based on the beginning instance in time of the respective delta violation. When the RPS has exceeded the maximum conforming load, the method includes determining that the delta violation corresponds to a full-history violation indicative of a degradation of performance of the information retrieval system.

20 Claims, 14 Drawing Sheets

(58) Field of Classification Search
USPC .......................................................... 718/102
See application file for complete search history.

(56) References Cited

U.S. PATENT DOCUMENTS

| | | |
|---|---|---|
| 8,392,558 B1 | 3/2013 | Ahuja |
| 8,429,282 B1 | 4/2013 | Ahuja |
| 10,516,687 B1 | 12/2019 | Ramamurthy |
| 11,061,930 B1 | 7/2021 | Golding |
| 11,068,461 B1 | 7/2021 | Chan |
| 2003/0181217 A1 | 9/2003 | Haas |
| 2004/0267800 A1 | 12/2004 | Gupta |
| 2008/0008090 A1 | 1/2008 | Gilfix |
| 2008/0008094 A1 | 1/2008 | Gilfix |
| 2008/0028409 A1 | 1/2008 | Cherkasova |
| 2011/0099233 A1 | 4/2011 | Calder |
| 2013/0332608 A1 | 12/2013 | Shiga |
| 2014/0379922 A1 | 12/2014 | Xiao |
| 2014/0380330 A1 | 12/2014 | Xiao |
| 2015/0100630 A1 | 4/2015 | Xiao |
| 2015/0370863 A1 | 12/2015 | Modarresi |
| 2016/0179562 A1 | 6/2016 | Kaneko |
| 2016/0188426 A1 | 6/2016 | Kousha et al. |
| 2016/0196324 A1 | 7/2016 | Haviv |
| 2017/0195247 A1 | 7/2017 | Tao |
| 2018/0137420 A1 | 5/2018 | Byron |
| 2018/0145883 A1 | 5/2018 | Kaneko et al. |
| 2018/0295044 A1 | 10/2018 | Johnson |
| 2020/0057558 A1 | 2/2020 | Beloussov |
| 2020/0097810 A1 | 3/2020 | Hetherington |
| 2020/0120124 A1 | 4/2020 | Ramamurthy |
| 2020/0175115 A1 | 6/2020 | Pandit |
| 2020/0278799 A1 | 9/2020 | Kumar |
| 2020/0314004 A1 | 10/2020 | Rashad |
| 2021/0349759 A1 | 5/2021 | Bansal |
| 2021/0173573 A1 | 6/2021 | Yu |

OTHER PUBLICATIONS

Muthukaruppan Annamalai et al: "Sharding the Shards: Managing Datastore Locality at Scale with Akkio", USENIX, USENIX, the Advanced Computing Systems Association, Oct. 8, 2018 (Oct. 8, 2018), pp. 452-467, XP061026288, Retrieved from the Internet: URL:https://www.usenix.org/system/files/psdi18_full_proceedings_interior.pdf [retrieved on Oct. 8, 2018]—the whole document, 16 pages.

Lin Shan et al: "A Workload-Driven Approach to Dynamic Data Balancing in MongoDB", 2015 IEEE International Conference On Smart City/Social.Com/Sustaincom (Smartcity) , IEEE, Dec. 19, 2015 (Dec. 19, 2015), pp. 786-791, XP032897349, DOI: 10.1109/SMARTCITY.2 015.163 [retrieved on May 2, 2016] the whole document, 6 pages.

International Search Report and Written Opinon for the related Application No. PCT/US2020/061879, dated Feb. 15, 2021, 18 pages.

UAPTO, Office Action relating to U.S. Appl. No. 16/693,556, dated Feb. 18, 2022.

Office Action for the related Japanese Patent Application No. 2023-076175, dated Jun. 11, 2024.

RULE VIOLATION DETECTION

CROSS REFERENCE TO RELATED APPLICATIONS

This U.S. patent application is a continuation of, and claims priority under 35 U.S.C. § 120 from, U.S. patent application Ser. No. 16/693,556, filed on Nov. 25, 2019. The disclosure of this prior application is considered part of the disclosure of this application and is hereby incorporated by reference in its entirety.

TECHNICAL FIELD

This disclosure relates to rule violation detection of, for example, a 500/50/5 traffic ramp-up rule.

BACKGROUND

Cloud computing and storage is rapidly gaining in popularity. As more and more users and businesses switch their data needs to distributed storage systems, performance degradation of cloud services becomes increasingly important. Large data stores (e.g., databases) are frequently spread over multiple servers and horizontally partitioned (i.e., shards) to increase performance. Sharding of the databases often allows the servers to handle dynamic loads by increasing and decreasing resources in near real-time. However, there is a non-zero reaction time for increasing resources, and a sufficiently fast ramp-up of traffic may overload the underlying storage and cause performance degradation.

SUMMARY

One aspect of the disclosure provides a method of detecting a traffic ramp-up rule violation. The method includes, receiving, at data processing hardware, data element retrieval requests that each request at least one data element from an information retrieval system. The information retrieval system includes a plurality of data elements. The method also includes determining, by the data processing hardware, a requests per second (RPS) for a key range of the information retrieval system based on a number of the data element retrieval requests received. The method also includes determining, by the data processing hardware, a moving average of RPS for the key range of the information retrieval system over a first time period based on the number of the data element retrieval requests received and determining, by the data processing hardware, a number of delta violations. Each delta violation includes a respective beginning instance in time when the RPS exceeded a delta RPS limit. The delta RPS limit is based on the moving average of RPS. For each delta violation, the method includes determining, by the data processing hardware, a maximum conforming load for the key range over a second time period and determining, by the data processing hardware, whether the RPS exceeded the maximum conforming load for the key range based on the beginning instance in time of the respective delta violation. The method also includes, when the RPS exceeded the maximum conforming load for the key range, determining, by the data processing hardware, that the delta violation corresponds to a full-history violation. The full-history violation is indicative of a degradation of performance of the information retrieval system.

Implementations of the disclosure may include one or more of the following optional features. In some implementations, determining whether the RPS exceeded the maximum conforming load for the key range based on the beginning instance in time of the respective delta violation includes determining, by the data processing hardware, a zero-history RPS limit. The zero-history RPS limit includes a function of a minimum of a historical zero-history RPS limit and the moving average of RPS. The method may also include determining, by the data processing hardware, a duration of time beginning at the beginning instance of the respective delta violation and ending when the RPS no longer exceeds the zero-history RPS limit. The method optionally includes determining, by the data processing hardware, a zero-history violation based on the duration of time that the RPS exceeded the zero-history RPS limit. In some examples, when the RPS exceeded the maximum conforming load for the key range, the method includes determining, by the data processing hardware, that the zero-history violation corresponds to one or more full-history violations.

In some implementations, the method further includes generating, by the data processing hardware, a request grid including a plurality of cells. Each cell represents a fixed-length time bucket of a key bucket and each key bucket includes a range of keys sized to represent a select average amount of requests. Determining the moving average of RPS may include determining a moving average of each key bucket. Optionally, each key bucket is sized to have the same average amount of requests. In some examples, determining the number of delta violations includes determining narrow-band candidate delta violations where each narrow-band candidate delta violation represents an instance in time when the RPS of the respective key bucket exceeds the delta RPS limit. The method may also include determining wide-band candidate delta violations from the narrow-band candidate delta violations where each wide-band delta violation includes neighboring narrow-band delta violations and determining, for each wide-band candidate delta violation, whether the wide-band candidate delta violation is a delta violation based on a quantity or intensity of the requests.

In some implementations, the maximum conforming load includes a maximum load the information retrieval system can maintain without degradation of performance. In some examples, the information retrieval system includes a dynamic range-sharded information retrieval system. Determining the maximum conforming load may include determining the maximum conforming load as a function of a number of data element retrieval requests previously received during a threshold window of time. Optionally, in between each adjacent pair of delta violations, the RPS does not exceed the delta RPS limit.

Another aspect of the disclosure provides a system for detecting traffic ramp-up rule violations. The system includes data processing hardware and memory hardware in communication with the data processing hardware. The memory hardware stores instructions that when executed on the data processing hardware cause the data processing hardware to perform operations. The operations include receiving data element retrieval requests that each request at least one data element from an information retrieval system. The information retrieval system includes a plurality of data elements. The operations also include determining a requests per second (RPS) for a key range of the information retrieval system based on a number of the data element retrieval requests received. The operations also include determining a moving average of RPS for the key range of the information retrieval system over a first time period based on the number of the data element retrieval requests received and determining a number of delta violations. Each delta violation includes a respective beginning instance in time when the RPS exceeded a delta RPS limit. The delta RPS limit is based on the moving average of RPS. For each delta violation, the operations include determining a maximum conforming load for the key range over a second time period and determining whether the RPS exceeded the maximum conforming load for the key range based on the beginning instance in time of the respective delta violation. The operations also include, when the RPS exceeded the maximum conforming load for the key range, determining that the delta violation corresponds to a full-history violation. The full-history violation is indicative of a degradation of performance of the information retrieval system.

This aspect may include one or more of the following optional features. In some implementations, determining whether the RPS exceeded the maximum conforming load for the key range based on the beginning instance in time of the respective delta violation includes determining a zero-history RPS limit. The zero-history RPS limit includes a function of a minimum of a historical zero-history RPS limit and the moving average of RPS. The operations may also include determining a duration of time beginning at the beginning instance of the respective delta violation and ending when the RPS no longer exceeds the zero-history RPS limit. The operations optionally include determining a zero-history violation based on the duration of time that the RPS exceeded the zero-history RPS limit. In some examples, when the RPS exceeded the maximum conforming load for the key range, the operations include determining that the zero-history violation corresponds to one or more full-history violations.

In some implementations, the operations further include generating a request grid including a plurality of cells. Each cell represents a fixed-length time bucket of a key bucket and each key bucket includes a range of keys sized to represent a select average amount of requests. Determining the moving average of RPS may include determining a moving average of each key bucket. Optionally, each key bucket is sized to have the same average amount of requests. In some examples, determining the number of delta violations includes determining narrow-band candidate delta violations where each narrow-band candidate delta violation represents an instance in time when the RPS of the respective key bucket exceeds the delta RPS limit. The operations may also include determining wide-band candidate delta violations from the narrow-band candidate delta violations where each wide-band delta violation includes neighboring narrow-band delta violations and determining, for each wide-band candidate delta violation, whether the wide-band candidate delta violation is a delta violation based on a quantity or intensity of the requests.

In some implementations, the maximum conforming load includes a maximum load the information retrieval system can maintain without degradation of performance. In some examples, the information retrieval system includes a dynamic range-sharded information retrieval system. Determining the maximum conforming load may include determining the maximum conforming load as a function of a number of data element retrieval requests previously received during a threshold window of time. Optionally, in between each adjacent pair of delta violations, the RPS does not exceed the delta RPS limit.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
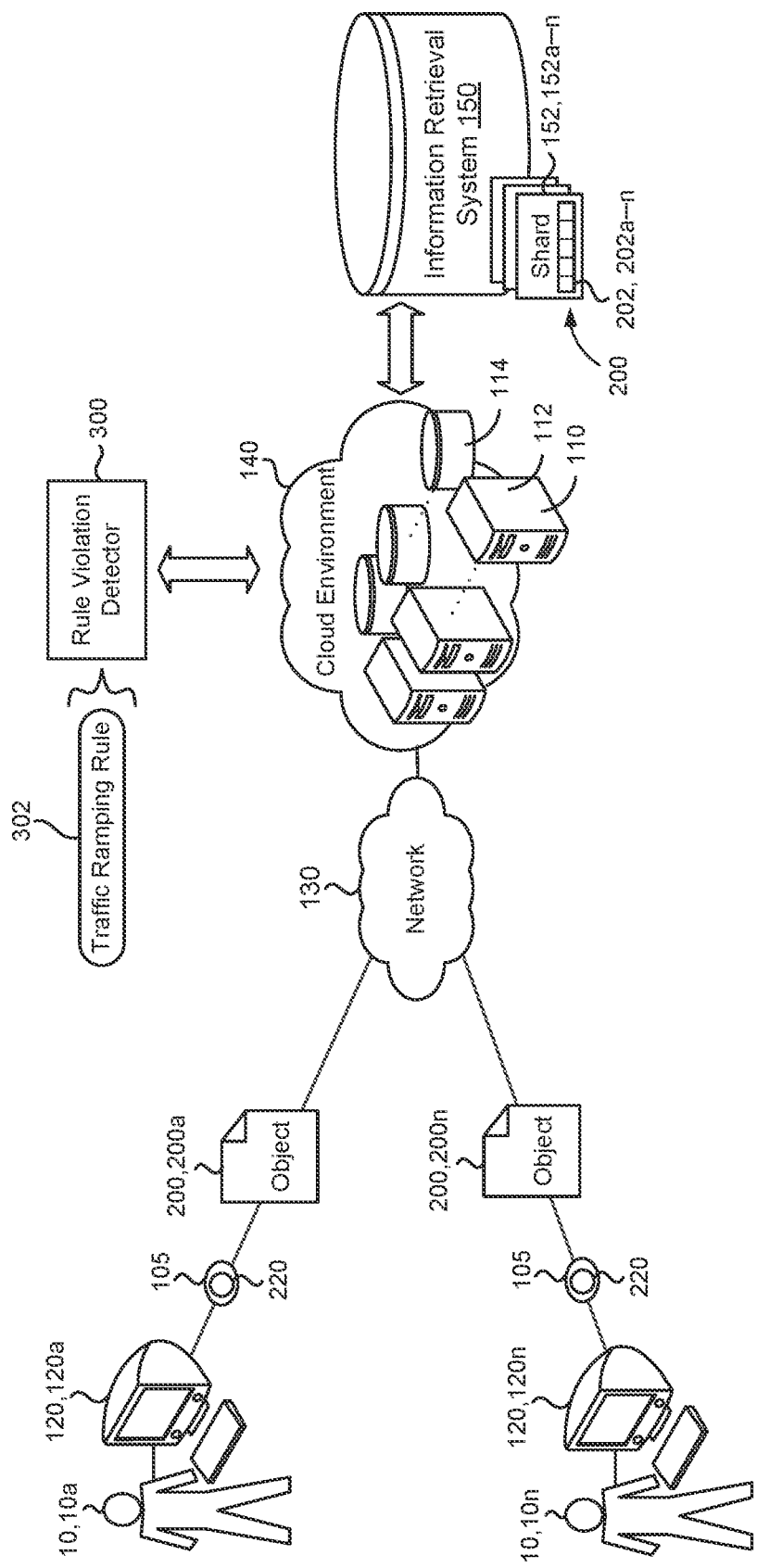
FIGS. 1A and 1B are schematic views of an example system that provides rule violation detection for an information retrieval system.

Implementations herein are directed toward detecting traffic ramp-ups in distributed storage systems (e.g., cloud storage) that exceed one or more traffic rules or otherwise indicate a potential for performance degradation. A rule violation detector detects violations of a traffic ramp-up rule and receives data element retrieval requests (i.e., to store or retrieve data) for an information retrieval system executing on a distributed storage system. The rule violation detector may receive a portion of the data element retrieval requests (i.e., sample the requests) sufficient to characterize all of the data element retrieval requests destined for the information retrieval system and determine a requests per second (RPS) for a key range of the information retrieval system. The rule violation detector determines a moving average of the RPS for the key range. Using the RPS and the moving average of RPS, the violation detector determines a number of delta violations over a time period. A delta violation includes an instance in time where the moving average RPS exceeded an RPS limit. For each delta violation, the violation detector determines a maximum conforming load for the key range and determines whether the moving average of RPS exceeded the maximum conforming load during a duration of the respective delta violation. When the moving average of RPS exceeded the maximum conforming load for the key range, the violation detector determines that the delta violation corresponds to a traffic ramp-up rule violation.

Distributed storage systems frequently partition databases to easily allow scaling by spreading the load across multiple machines. Databases may be vertically or horizontally partitioned. Horizontally partitioning a database may also be referred to as sharding the database. Each individual partition is referred to as a shard and each shard may be stored on a separate server or other independent computing device. Sharding a database involves separating rows of the database into multiple different tables. This is in contrast to separating columns into different tables (e.g., vertical partitioning). Each partition may have the same columns but different rows. A number of different sharding techniques may be implemented. For example, key based sharding, range based sharding, and directory based sharding are all typical implementations of sharding.

Ranged based sharding involves sharding the data of the database based on ranges of values of shard keys associated with the data. That is, each row of the database is associated with a shard key and the value of the associated shard key determines which shard the row of data is stored at. Each shard may be assigned a contiguous range of shard key values. Thus, data with "close" shard key values is likely to be stored in the same shard, which may increase the efficiency of some requests or operations or queries.

Some distributed storage systems (e.g., range-sharded storage systems) may adjust key-range load balancing according to variations in the incoming load. This may be referred to as key-range capacity auto-scaling. As previously discussed, the full keyspace is split into a number of shards (i.e., key-range splits), which are units of load-balancing. Sustained increased load for a threshold period of time on a shard may result in a "split" operation, where the shard is divided into 2 or more shards (e.g., adding one or more additional servers or spreading the shards across existing servers), which may effectively double (or more) the capacity of the key-range. In some implementations, adjacent key-range splits that experience low levels of load for a period of time are merged together (i.e., a "merge" operation) to recover unused resources. In some examples, the period of time for a split operation is much shorter than the period of time for a merge operation. For example, the period of time for a split operation may be on the order of 5 minute while the period of time for a merge operation may be on the order of a day. Thus, the effective capacity of an arbitrary key-range may be doubled rapidly and the generated capacity may be retained for long period of time to protect against additional spikes in data.

Because there is a delay before capacity may be increased via a split operation (e.g., 5 minutes), a sufficiently large and fast ramp-up of user traffic to a single shard (i.e., a key-range split) may result in performance degradation. The splitting and merging behavior of such key-range capacity auto-scaling systems may be modeled by a traffic ramp-up rule. User traffic may be compared against the model to determine violations of the traffic ramp-up rule. A violation of the traffic ramp-up rule may be indicative of performance degradation. In some examples, such a violation impacts the cloud service provider's guarantees (i.e., performance guarantees) to the client responsible for the violation. An example of a traffic ramp-up rule may be a 500/50/5 rule or the like. With a 500/50/5 rule, a client may begin operating over an arbitrary key-range at 500 RPS and from there increase traffic by 50% every 5 minutes. Following this rule may ensure that the system can add resources fast enough that performance degradation does not occur.

In some examples, the traffic ramp-up rule models a traffic limit that user traffic must remain under (e.g., in RPS) in order to avoid degradation of performance of the information retrieval system. Because of the nature of the splitting and merging of the key-range splits, the traffic limit inherently has historical dependencies on previous traffic data and traffic limits. Because of the vast quantities of data and the historical dependencies of determining traffic limits, determining violations of the traffic ramp-up rule typically is a very computationally expensive endeavor.

Figure 1B:
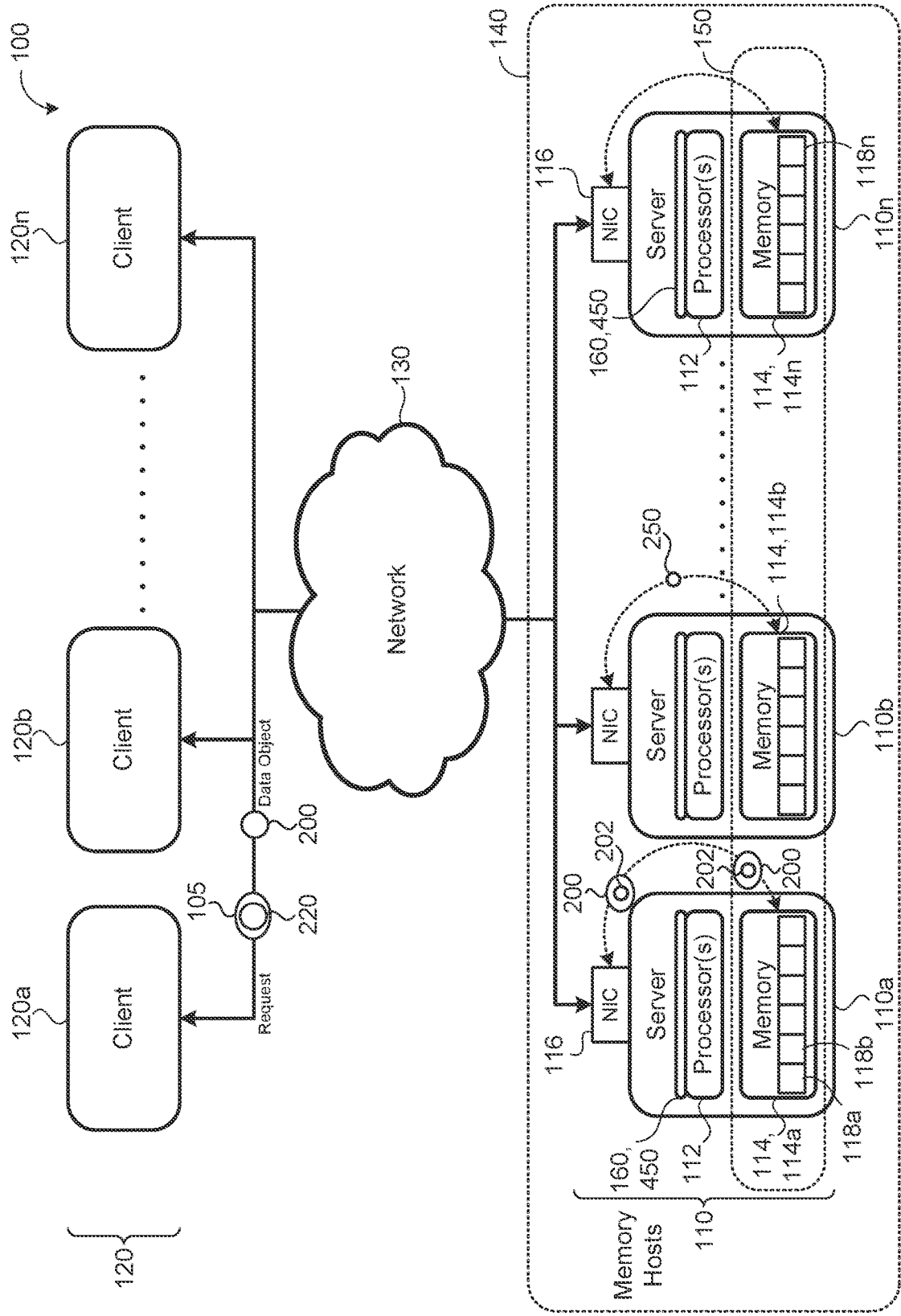

Referring to FIGS. 1A and 1B, in some implementations, a system 100 includes one or more client devices 120, 120a-n associated with one or more clients/customers/owners 10, 10a-n, who may communicate, via a network 130, with a remote system 140. The remote system 140 may be a distributed system (e.g., cloud environment) having scalable/elastic resources 110. The resources 110 include computing resources 112 and/or storage resources 114. An information retrieval system 150 (e.g., a distributed storage system or a data store) is overlain on the storage resources 114 to allow scalable use of the storage resources 114 by one or more of the client devices 120. The information retrieval system 150 is configured to store data objects 200, 200a-n from the client devices 120. In some examples, the data objects include databases (i.e., rows and columns of data elements 202, 202a-n).

The remote system 140 receives data objects 200 from a client device 120 and stores the data objects 200 on the storage abstraction 150 by chunking or separating the data objects 200 into constituent data elements or data chunks 202 and storing the data elements on one or more shards 152, 152a-n. Alternatively, the remote system 140 generates an empty data object 200 and receives data elements 202 from the client device 120 to store within the data object 200. As used herein, each shard 152 represents separate computing resources 112 and storage resources 114 (e.g., a separate server) that stores a horizontal partition of the data object 200. The remote system 140 may implement any number of shards 152 and may dynamically add or remove shards 152 based on utilization.

The remote system 140 receives data element retrieval requests 105 from the clients 10 to retrieve one or more data elements 202 from the information retrieval system 150. The information retrieval system 150 will determine the location of the data element(s) 202 based on a shard key value 220 (i.e., which shard 152 the data element 202 is stored at) provided in each data element retrieval request 105. Once the proper shard 152 is determined, the information retrieval system 150 fetches the appropriate data elements 202 and returns them to the requesting client 10. The data element retrieval requests 105 may also include requests to add additional or update existing data elements 202 to the information retrieval system 150. Again, the information retrieval system 150 may use the associated shard key value 220 included in the retrieval request 105 to determine the appropriate shard 152 for storing the uploaded data elements 202.

Referring to FIG. 1B, in some implementations, the distributed system 140 includes loosely coupled memory hosts 110, 110a-n (e.g., computers or servers), each having a computing resource 112 (e.g., one or more processors or central processing units (CPUs)) in communication with storage resources 114 (e.g., memory hardware, memory hardware, flash memory, dynamic random access memory (DRAM), phase change memory (PCM), and/or disks) that may be used for caching data. The storage abstraction 150 overlain on the storage resources 114 allows scalable use of the storage resources 114 by one or more client devices 120, 120a-n. The client devices 120 may communicate with the memory hosts 110 through the network 130 (e.g., via remote procedure calls (RPC)).

In some implementations, the distributed system 140 is "single-sided." "Single-sided" refers to the method by which most of the request processing on the memory hosts 110 may be done in hardware rather than by software executed on CPUs 112 of the memory hosts 110. Additional concepts and features related to a single-sided distributed caching system can be found in U.S. Pat. No. 9,164,702, which is hereby incorporated by reference in its entirety.

The distributed system 140 may store constituent data elements or data chunks 202 of data objects 200 uploaded by client devices 120 on the storage resources 114 (e.g., memory hardware) of the remote memory hosts 110 (e.g., storage abstraction 150) and get the data chunks 202 from the remote memory hosts 110 via RPCs or via remote direct memory access (RDMA)-capable network interface controllers (NIC) 116. A network interface controller 116 (also known as a network interface card, network adapter, or LAN adapter) may be a computer hardware component that connects a computing device/resource 112 to the network 130. Both the memory hosts 110a-n and the client device 120 may each have a network interface controller 116 for network communications. The information retrieval system 150 executing on the physical processor 112 of the hardware resource 110 registers a set of remote direct memory accessible registers a set of remote direct memory accessible regions/locations 118, 118a-n of the storage resource (e.g., memory) 114 with the network interface controller 116. Each memory location 118 is configured to store a corresponding data element 202.

Figure 2:
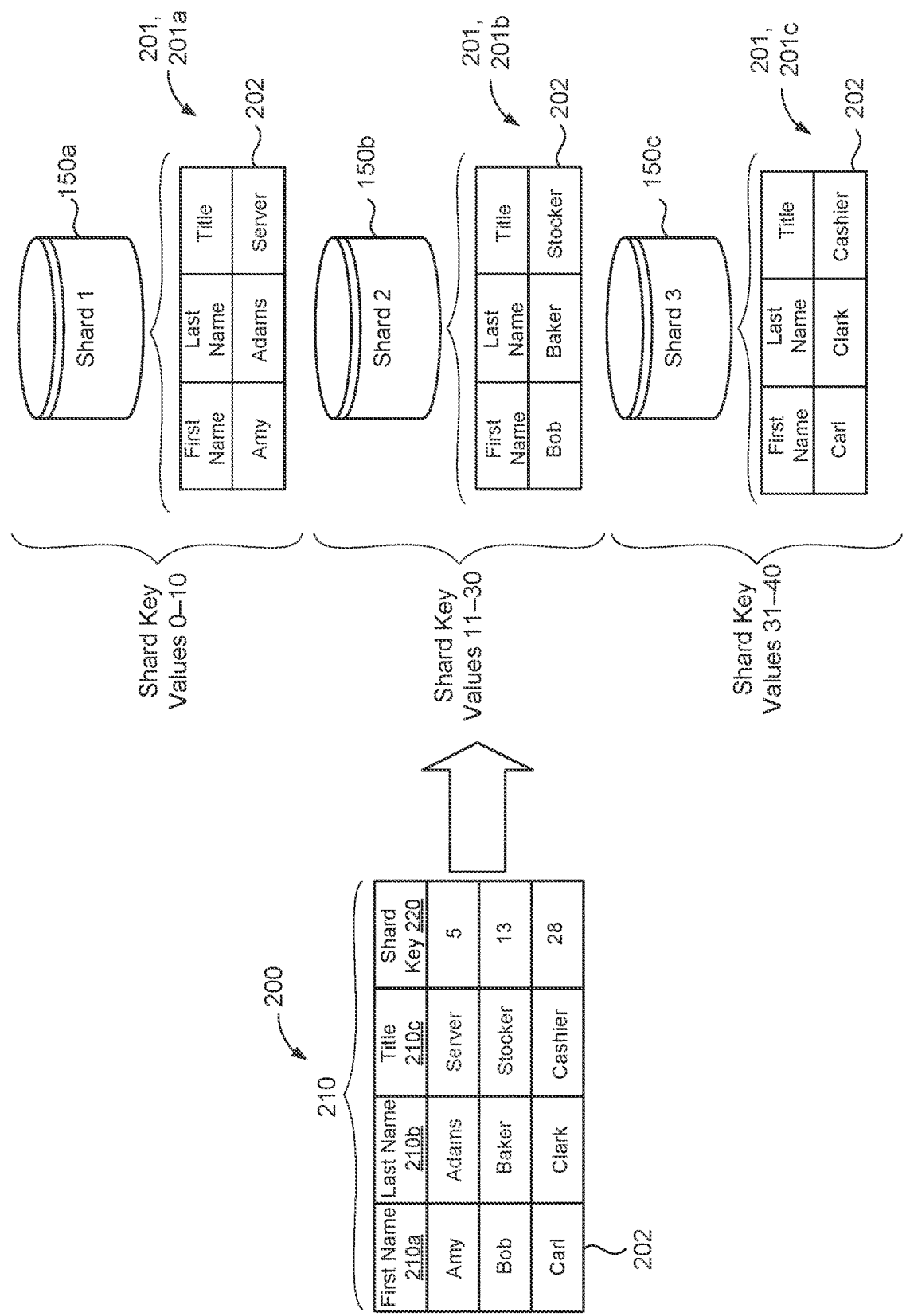
FIG. 2 is a schematic view of horizontal partitioning of a data object.

Referring now to FIG. 2, an exemplary data object 200 (i.e., a table) includes a number of data elements 202 demarcated by columns 210 including a first name column 210a, a last name column 210b, a title column 210c, and a column of shard key values 220. Here, the table 200 has three rows for simplicity, but in practice the table may have up to trillions of rows. As previously discussed, the remote system 140 may separate the data object 200 using horizontal partitioning and store the partitions on separate shards 152. In this example, the data object 200 is separated and stored Shard 1 150a, Shard 2 150b, and Shard 3 150c based on the shard key value 220. In this example, Shard 1 150a stores data elements 202 that are associated with a shard key value 220 between 0 and 10. That is, all data elements associated with a shard key value 220 between 0 and 10 may be stored at Shard 1 150a. Shard 2 150b stores data elements 202 that are associated with a shard key value 220 between 11 and 30. Similarly, Shard 3 150c stores data elements 202 that are associated with a shard key value 220 between 31 and 40. These values are exemplary only, and it is understood that the shard key values 220 may be assigned any value (with any or no relationship to the rest of the data object 200) and each shard 152 may support any range of shard key values 220. For example, the shard key value 220 may be assigned to an existing column of data elements 202 within the data object 200 (e.g., an employee number, a cost of an item, a location field, etc.). The relationship between the shard key values 220 and the data elements (e.g., the shard key cardinality, the shard key frequency, etc.) may affect the performance of the information retrieval system 150.

Still referring to FIG. 2, the data object 200 is partitioned into three partial data objects 201, 201a-c, each with a number of data elements 202. Here, the row with the shard key value 220 of "5" was stored at Shard 1 150a, while the row with the shard key value 220 of "13" was stored at Shard 2 150b. Similarly, the row with the shard key value 220 of "28" was stored at Shard 3 150c. In this way, the data object 200 is split among three shards 150a, 150b, 150c (each of which may be a separate computing resources), thereby increasing the information retrieval system's 150 access capacity to the data object 200.

Referring back to FIG. 1A, the remote system 140 executes a rule violation detector 300. As discussed in more detail below, the rule violation detector 300 monitors client data element retrieval requests 105. Because the number of requests 105 may be extraordinarily large, in some examples, the rule violation detector 300 randomly samples a portion of the requests 105 sufficient to be representative of the totality of the requests 105. The rule violation detector 300, using the sampled requests 105, determines whether the requests 105 violate a traffic ramp-up rule 302. The traffic ramp-up rule 302 outlines, for example, the maximum rate that user traffic (i.e., requests 105) may increase over arbitrary key-ranges to avoid performance degradation.

Figure 3:
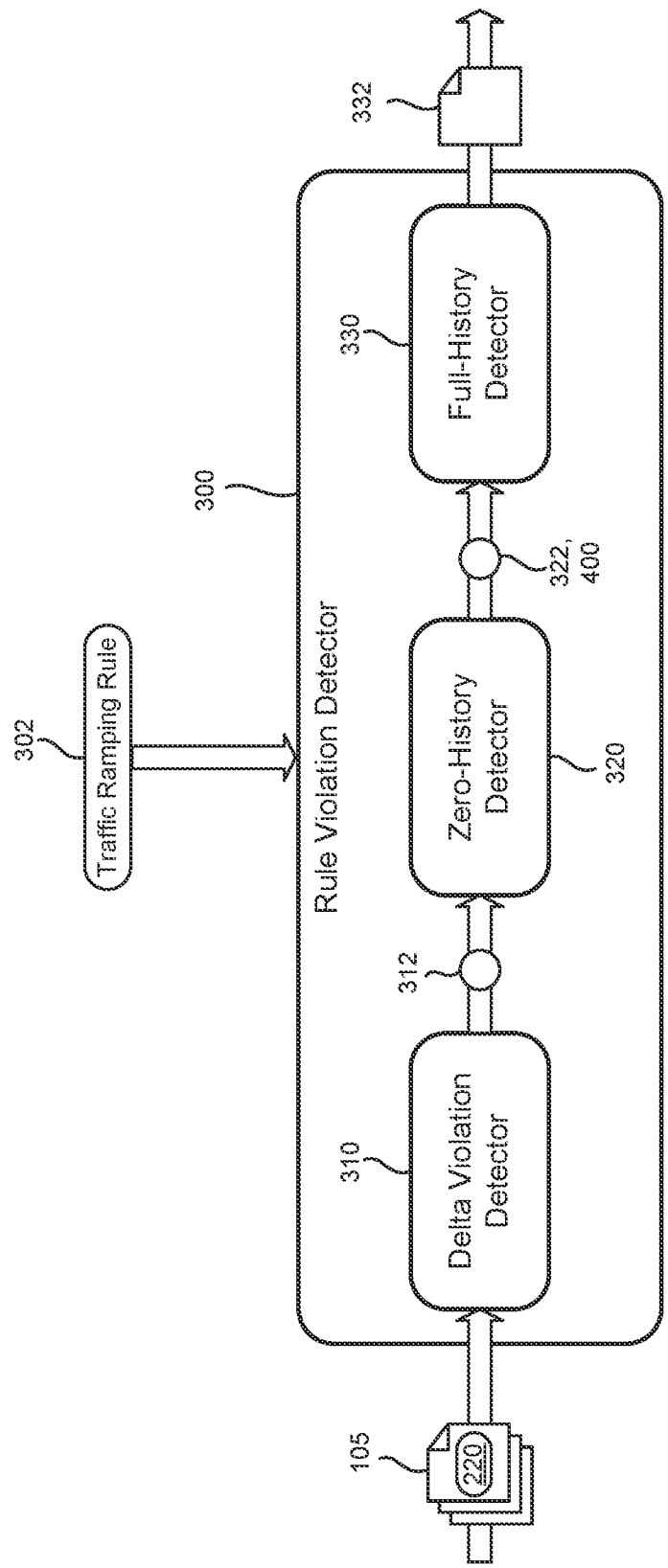
FIG. 3 is a schematic view of exemplary components of a rule violation detector.
Figure 4:
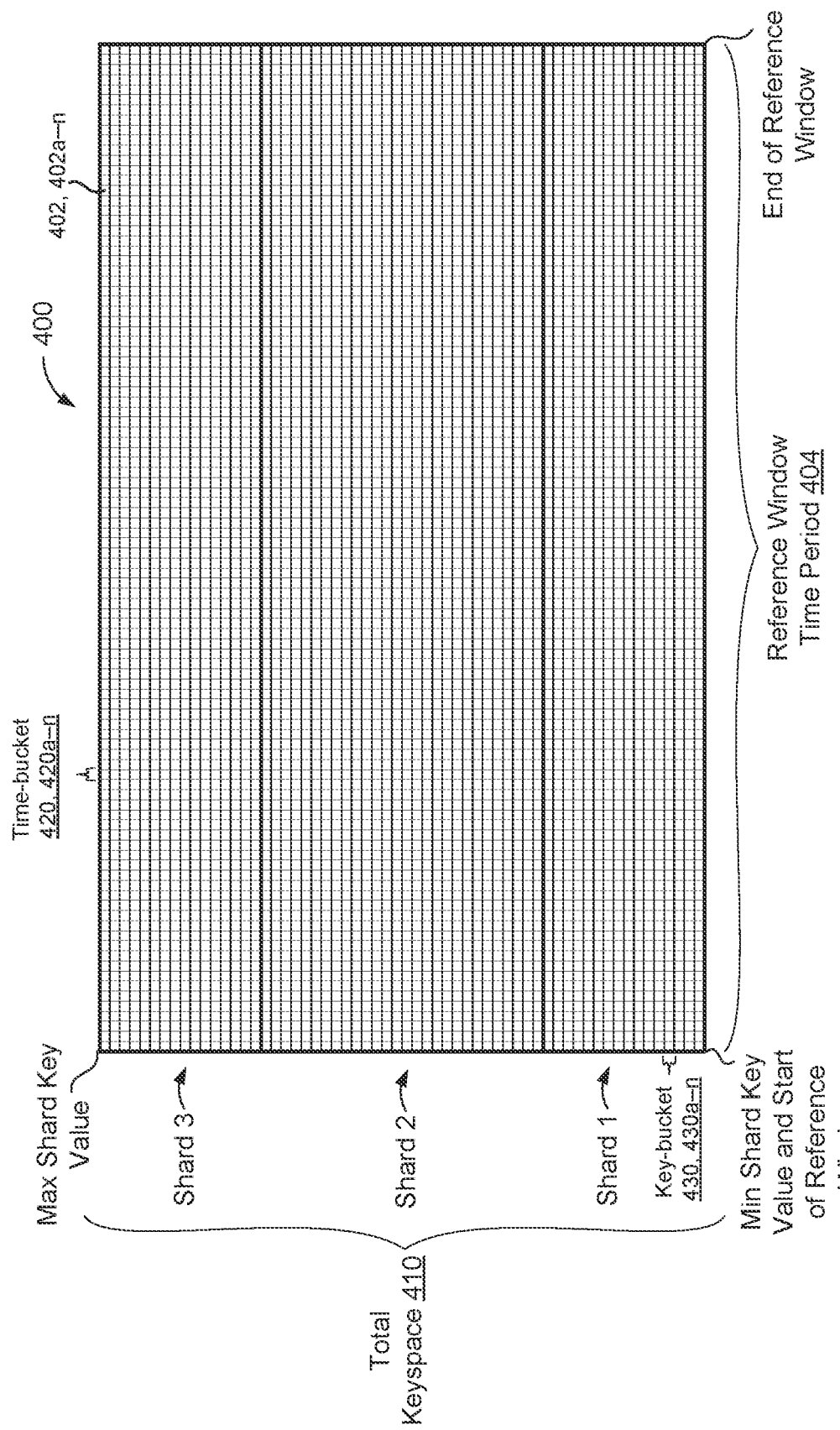
FIG. 4 is a schematic view of a grid of grid elements that represent a keyspace over at least a portion of a reference window of requests to the information retrieval system.
Figure 7:
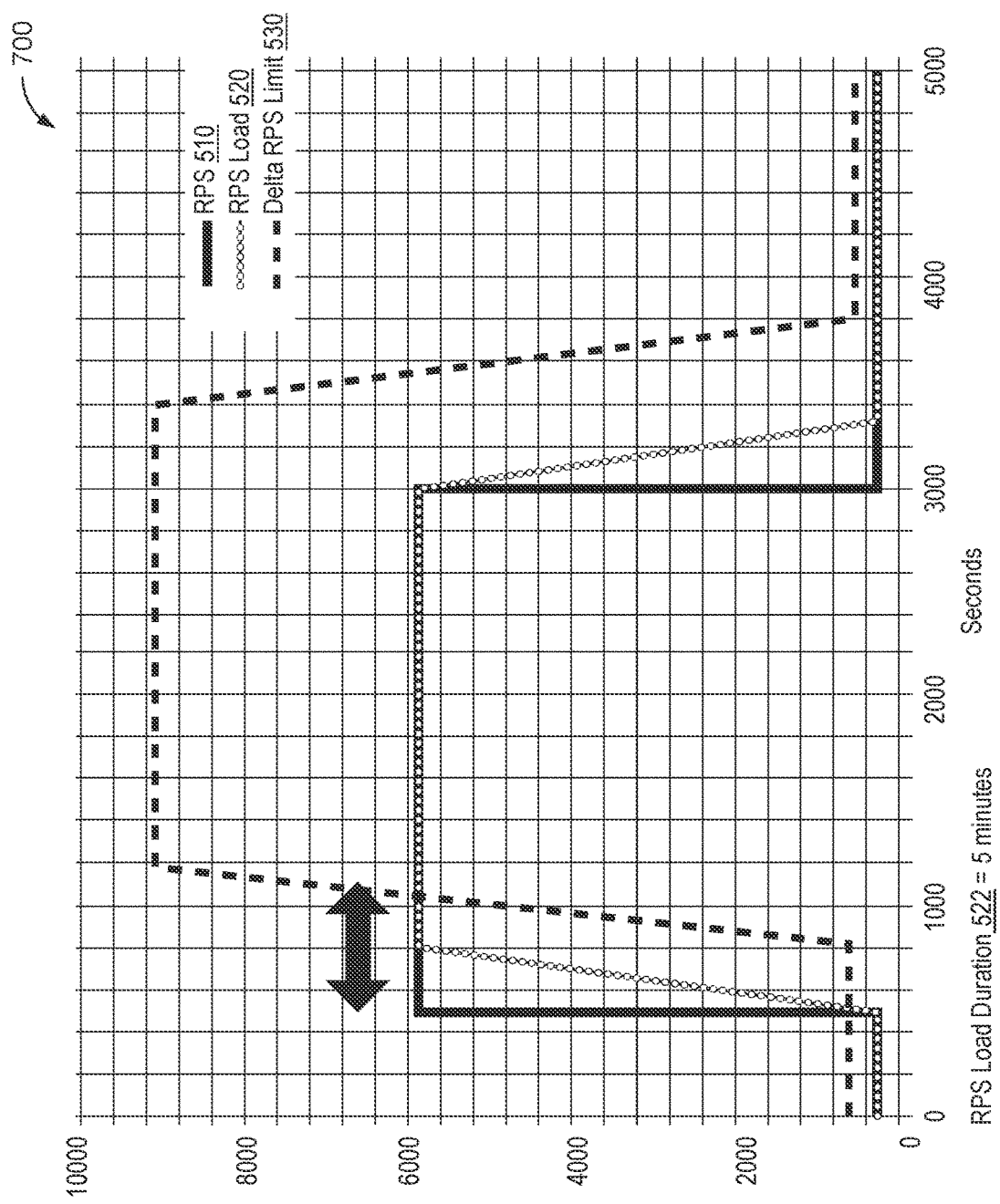
FIG. 7 is a schematic view of another plot of the RPS, the RPS load, and the delta RPS limit.

Referring now to FIG. 3, in some implementations, the rule violation detector 300 includes a delta detector 310, a zero-history detector 320, and a full-history detector 330. In some examples, the sampled requests 105 may not characterize all the trends in traffic, but instead only the most significant or notable load variations in traffic. Various sampling techniques may be implemented to help control and/or minimize sampling error. The rule violation detector 300 receives the sampled requests 105 at the delta detector 310. In some examples, the delta detector 310 receives sampled requests 105 (herein also referred to generically as "traffic") for a period of time at least as long as a reference window 404 (FIG. 4). In some examples, the reference window 404 is equivalent to an amount of time the information retrieval system 150 will maintain capacity after a split operation minus the amount of time the information retrieval system 150 requires to perform a split operation. The time period in which the system 150 will maintain capacity is herein referred to as the RPS history, while the time period required by the system 150 to increase capacity is herein referred to as the RPS delay 726 (FIG. 7). For example, when the information retrieval system 150 requires five (5) minutes to perform a split operation (i.e., increase capacity in response to increased traffic) and maintains the increases capacity for 25 hours before performing a merge operation, the reference window 404 may have a duration of 24 hours and 55 minutes. As used herein, the terms "requests per second (RPS)" and "queries per second (QPS)" may be used interchangeably.

Because the traffic ramp-up rule 302 has a historical dependency in the past as long as the RPS history, the reference window 404 is sized to encompass all of the necessary history from the current time. Put another way, because of the historical dependency of the traffic ramp-up rule 302, in order to determine a violation of the traffic ramp-up rule 302 at time ts, all of the traffic and the traffic limits for a previous period of time equivalent to the RPS history (25 hours in this example) is used. In some examples, a period of recent time may not be relevant (e.g., RPS delay 726) as the system has not yet had time to respond to traffic increases. Thus, the reference window 404 provides a sliding window of time to determine violations at an instance in time. It is understood that the specific values used herein are exemplary and may be substituted with any values unless otherwise noted. The sampled requests 105 received by the delta detector 310 may be representative of all traffic during the reference window 404.

Referring now to FIG. 4, in some implementations, the sampled traffic is placed in a grid 400 of grid elements 402, 402a-n. The x-axis of the grid may represent time in seconds, with each grid element 402 representing a fixed length "time-bucket" 420, 420a-n. Each time-bucket 420 represents all the sampled traffic that occurred during a set amount of time. For example, each time-bucket 420 (i.e., the x-axis of each grid element 402) may represent 10 seconds of time. The length of the time-buckets 420 is tunable (i.e., adjustable). When the reference window 404 is 24 hours and 55 minutes (i.e., the RPS history minus the RPS delay 726), the grid 400 would have an x-axis length of 8970 elements (one grid element 402 for each 10 seconds of the 24 hour and 55 minute hour reference window 404). In some examples, the delta detector 310 sequentially grids portions of the reference window 404 in order to minimize the size of the grid 400. That is, the length of the grid 400 may represent only a portion of the reference window 404. In some examples, the length of the grid may be a ratio of the reference window 404. For example, the delta detector 310 may generate the grid 400 for the first 2 hour portion of the reference window 404 and analyze or process the data. After completion, the delta detector 310 may generate the grid 400 for the next 2 hours portion of the reference window 404 and so on until the entire reference window 404 is processed. In some implementations, the generated grids 400 may not completely align or match on key-bucket boundaries. By tuning grid generation parameters and using approximation techniques, the necessary metrics may be derived across the grids 400 with an acceptable level of error.

The y-axis of the grid 400 may represent at least a portion of the keyspace 410 of the information retrieval system 150. The keyspace 410 represents all of the potential shard key values 220 and the y-axis, in some examples, represents the entire keyspace 410 (i.e., from a minimum shard key value 220 to a maximum shard key value 220), and in other examples represents only a relevant portion of the keyspace 410. Each grid element 402 may represent a key-bucket 430, 430a-n (i.e., the "height" of the grid element 402 represents a range of keys). A key-bucket 430 is defined as a narrow range or narrow band of keys with a start key and an end key. For example, if the keyspace 410 consisted of all whole numbers between 0 and 999, one key-bucket 430 may represent shard-key values between 0 and 9. Put another way, each grid element 402 represents a slice of the total keyspace 410 (i.e., a key-bucket 430) for a period of time (i.e., a time bucket 420). In some examples, each key-bucket 430 is the same size (i.e., represents an equal amount of the keyspace 410). In other examples, each key-bucket 430 is sized such that each key-bucket 430 represents approximately the same amount of traffic. For example, each key-bucket 430 may represent keyspace that experiences roughly an average of 50 RPS over the length of the grid 400 (which may be a portion, e.g., 2 hours, of the reference window 404). It is not important that each key-bucket 430 represents exactly the same amount of traffic and rough estimates suffice. Requests per second may also be referred to as queries per second (QPS). Thus, each grid element 402 of the grid 400 may represent a number of requests 105 for a given key-range (i.e., key-bucket 430) over a given time period (i.e., a time-bucket 420). This number of requests 105 may be referred to as the RPS 510 for that key-bucket 430 at that time-bucket 420. In some examples, the RPS 510 is equivalent to the average RPS multiplied by the length of the time-bucket 420. For example, when the average RPS is 50 and each time-bucket represents 10 seconds, each grid element 402 would represent 500 requests.

Figure 5:
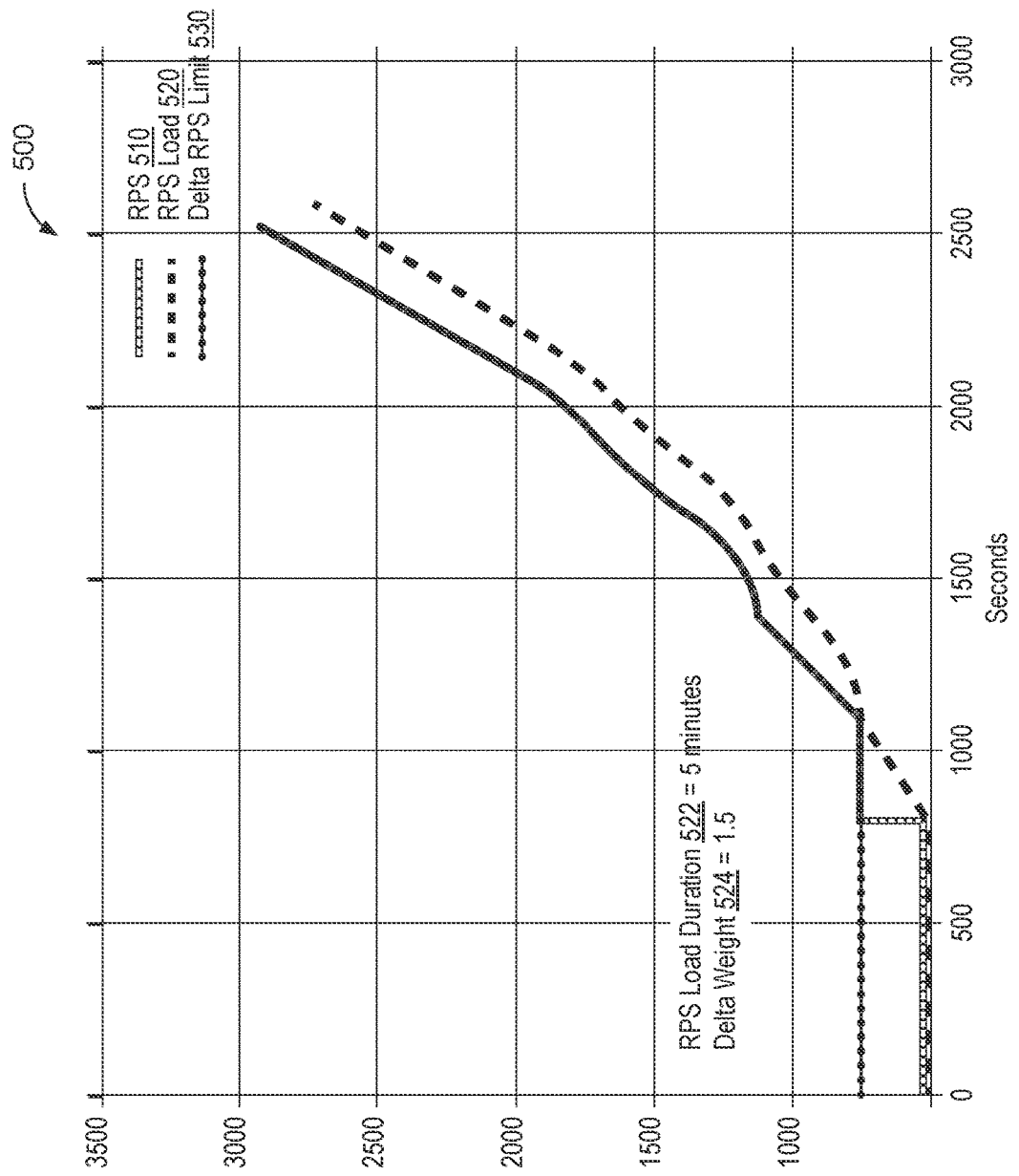
FIG. 5 is a schematic view of a plot of a requests per second (RPS), a RPS load, and a delta RPS limit.

Using the grid 400, the delta detector 310 may determine a moving average of each key-bucket 430. The moving average is referred to herein as a RPS load 520 (FIG. 5). The moving average (i.e., the RPS load 520) is determined over a period of time referred to as a RPS load duration 522 (FIG. 5). In some examples, the RPS load duration 522 is five minutes. Here, for each grid element 402, the moving average of the previous five minutes is determined as the RPS load 520 for the respective key-bucket 430. In some implementations, the delta detector 310 determines that a delta violation 312 occurred whenever the RPS 510 (FIG. 5) at a point in time exceeds the RPS load 520 at a point in time equivalent to the RPS delay 726 before the same point in time multiplied by a delta weight 524 (e.g., 1.5) (FIG. 5). The RPS load 520 multiplied by the delta weight 524 at a point in time (i.e., ts) after RPS delay 726 (i.e., ts-RPS delay) may be referred to as a delta RPS limit 530 at time ts (FIG. 5). That is, the RPS limit at timestamp ts may be the delta weight 524 multiplied by the RPS load 520 at (ts-RPS delay). The delta weight 524 may model capacity increase after a split operation (i.e., one or more shards are added). In some examples, the RPS 510 may be a second moving average over a different time length than RPS load 520. That is, in some examples, a delta violation 312 may be determined based on two moving averages with different lengths (e.g., 5 minutes and 1 minute).

Figure 6:
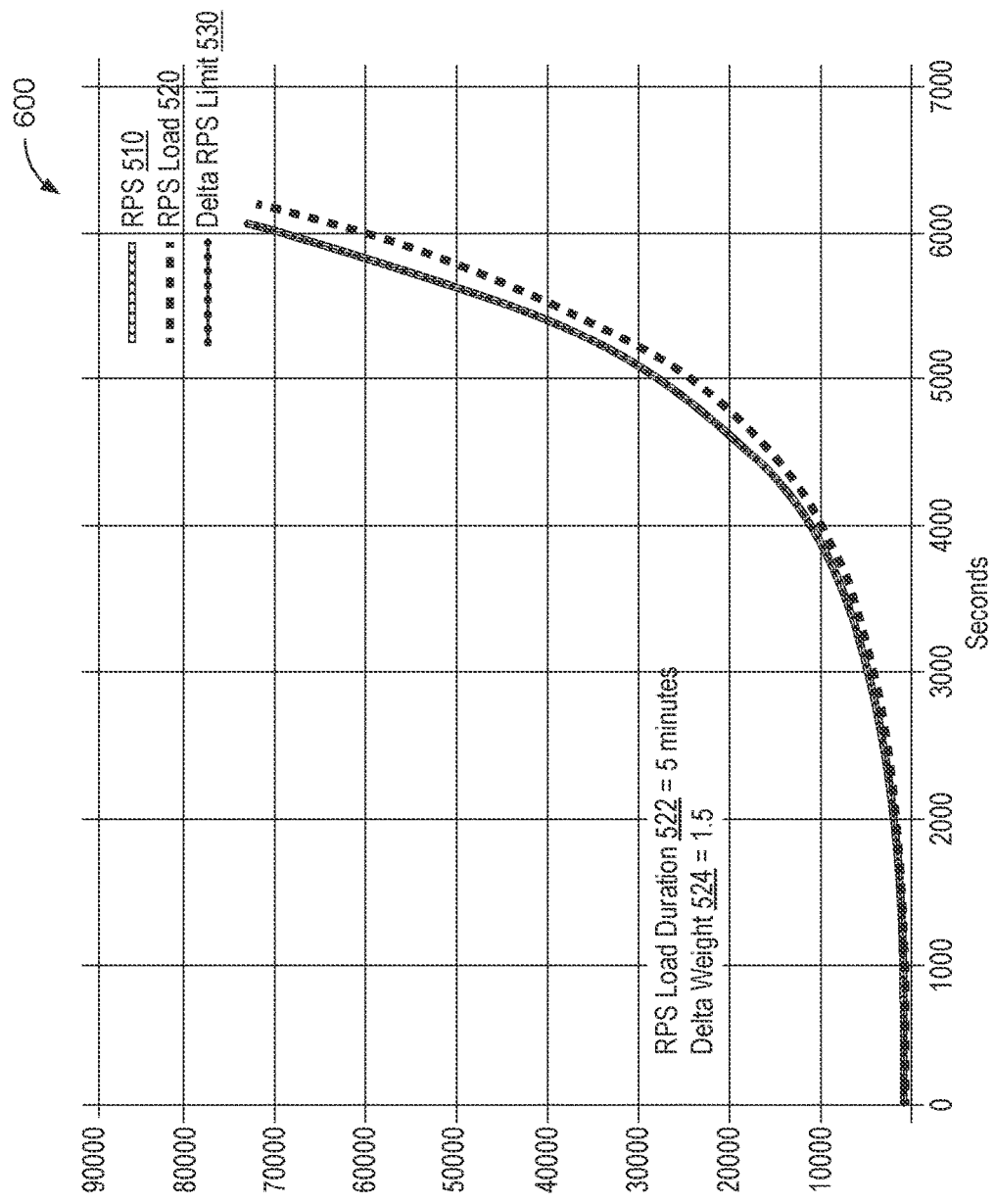
FIG. 6 is a schematic view of another plot of the RPS, the RPS load, and the delta RPS limit.

Referring now to FIG. 5, a plot 500 with an x-axis of time (in seconds) and a y-axis in RPS illustrates the relationship between the RPS 510, the RPS load 520, and the delta RPS limit 530 when user traffic ramps up at the maximum amount without violating the delta RPS limit 530. At time 0 and until approximately 750 seconds, the RPS 510 remains constant at "500". Because the RPS 510 is constant, the RPS load 520 (i.e., the moving average of RPS 510) is also constant at "500". In this example, the delta weight 524 is equal to about "1.5", and therefore, the delta RPS limit 530 is equal to the result of "500" multiplied by "1.5" (i.e., 750). At time=750 seconds, the RPS 510 increases to the delta RPS limit 530 of "750". After a period of time (i.e., the RPS delay 726), the delta RPS limit 530 increases and the RPS 510 (i.e., the user traffic) and the RPS load 520 increased to match the delta RPS limit 530. The delta RPS limit 530 increase trails the increase in RPS 510 due to RPS delay. That is, this lagging models the behavior of the information retrieval system 150, as the system 150 will have a delay before additional resources can be added (e.g., adding shards 152). FIG. 6 illustrates a plot 600 with the same data as the plot 500, but with a greatly increased time scale for the x-axis. This time scale makes it apparent that the delta RPS limit 530 increases at an approximately exponential rate. In the example shown in FIGS. 5 and 6, the RPS 510 never exceeds the delta RPS limit 530, and thus the delta detector 310 would not determine the existence of a delta violation 312.

Referring now to FIG. 7, another plot 700 provides an example of a different traffic pattern from FIGS. 5 and 6. Here, the x-axis again is time (in seconds) and the y-axis is requests per second. At time 0, the RPS 510 and the delta RPS limit 530 are stable at "500" and "750" respectively. In this case, at time≈500 seconds, the user traffic (represented by RPS 510) rapidly increases to "6000", which exceeds the delta RPS limit 530 of "750". The user traffic then, at time≈3000 seconds, returns to 500 RPS. Shortly after the first traffic spike (i.e., the RPS delay 726), the delta RPS limit 530 increases to "9000" (i.e., 6000 multiplied by the delta weight 524 of 1.5). In this example, the delta detector 310 would detect a delta violation 312 starting at the traffic spike at time 500 seconds and lasting until the delta RPS limit 530 is no longer exceeded by the RPS 510 (at t≈1000 seconds). The increase in the delta RPS limit 530 (due to the increase of the RPS load 520) causes the remaining portion of the traffic spike (from t≈1000 seconds to t≈3000 seconds) to not be a delta violation 312. After the traffic spike, the RPS load 520 returns to 500 RPS and the delta RPS limit 530 returns to 750 RPS.

Referring back to FIG. 3, while a delta violation 312 does not necessarily result in a violation of the traffic ramp-up rule violation (as explained in more detail below), the delta detector 310 may efficiently analyze vast quantities of data (i.e., user traffic) and quickly identify periods of traffic to specific key ranges that may indicate a traffic ramp-up rule violation (i.e., a full-history violation 332). Put another way, the delta detector 310 detects all the areas in the traffic that may have experienced a sudden increase in load. The delta detector 310 may detect a delta violation 312 across nearly any range of the keyspace 410.

The delta detector 310 also may determine the widest key-range delta violation 312 (i.e., a wide-band delta violation) by combining narrower key-range violations (i.e., key-buckets 430 or narrow-band delta violations). In other words, when a heavy load increase corresponds to a wide key-range, narrower key-ranges, when combined with other delta violations 312 near each other (in keyspace), construct the wider key-range and experience a similar trend in traffic. Thus, the delta detector 300 may determine delta violations 312 that are candidates to be a violation of the traffic ramp-up rule 302. That is, the delta detector 310 may determine narrow-band candidate delta violations 312, and from the narrow-band candidate delta violations, determine a wide-band candidate delta violation from the narrow-band candidate delta violations. The delta detector 310 may apply additional traffic rules to determine whether combined delta violations 312 (i.e., the wide key-range delta violations) experience an impactful amount of traffic load increases. For example, the delta detector 310 considers an intensity of the increased load in addition to the peak to provide additional filtering.

Thus, the delta detector 310 detects delta violations 312 over the entire keyspace 410 and constructs wide-band delta violations from narrow-band delta violations. The delta detector 310 avoids the need for limit derivations over arbitrary key-ranges, which greatly reduces computation complexity, while simultaneously significantly trimming the search space for traffic ramp-up rule violations.

With continued reference to FIG. 3, the delta detector 310 sends any detected delta violations 312 and any relevant data (i.e., timestamps, key-range, etc.) to the zero-history detector 320. In some implementations, delta violations 312 do not fully capture the dynamics of the model of the key-range capacity auto-scaling systems, as delta violations 312 only identify areas in the grid 400 that have had an impactful increase in traffic levels. That is, a violation of the traffic ramp-up rule 302 begins with a delta violation 312, but not every delta violation 312 corresponds to a full-history violation 332.

Figure 8:
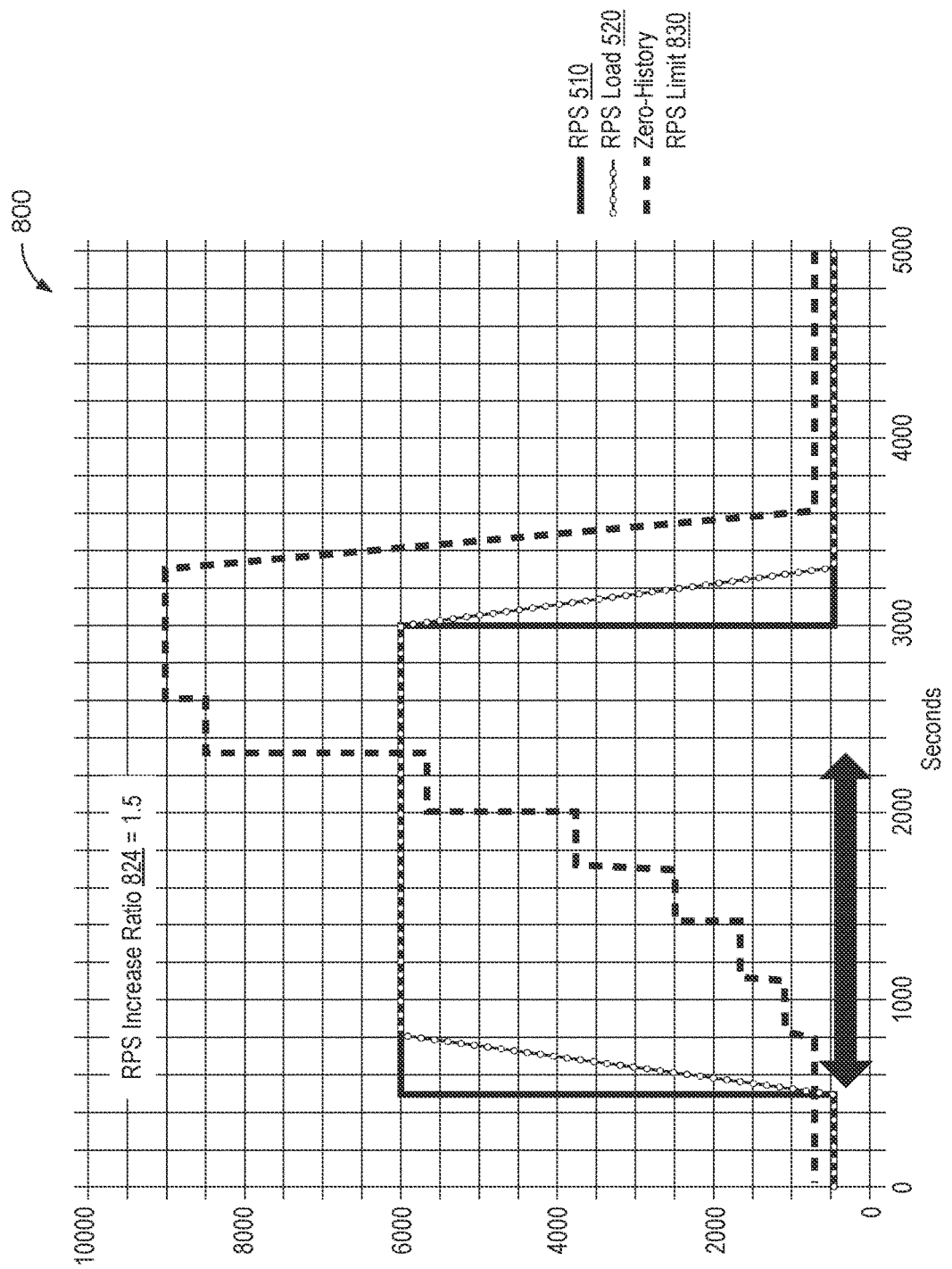
FIG. 8 is a schematic view of a plot of the RPS, the RPS load, and a zero-history RPS limit.

The delta detector 310 uses the delta RPS limit 530 for simplicity (i.e., to efficiently reduce the search space), but, in some examples, the delta RPS limit 530 does not represent the actual rate the RPS limit for the model of the key-range capacity auto-scaling systems increases. Instead, a zero-history RPS limit 830 (FIG. 8) may be used to more accurately model the traffic rule 302. For example, instead of the RPS load 520 multiplied by the delta weight 524 (i.e., the delta RPS limit 530) at an instance in time (i.e., an RPS delay amount of time prior to the timestamp of interest), the zero-history RPS limit 830 may instead be a function of the minimum of the RPS load 520 and the zero-history RPS limit 830 at the same instance in time (i.e., a historical zero-history RPS limit 830) multiplied by an RPS increase ratio 824 (FIG. 8). That is, the increase of the zero-history RPS limit 830 may be capped by previous limits and thus may take longer to respond to large traffic spikes.

Referring now to FIG. 8, a plot 800 illustrates the relationship between the RPS 510, the RPS load 520, and the zero-history RPS limit 830. The plot 800 again has an x-axis of time (in seconds) and a y-axis in RPS. Here, the RPS increase ratio 824 is equal to "1.5". While in this example, the RPS increase ratio 824 is the same as the delta weight 524 in previous examples, the values may also be different. At time 0, the RPS 510 and RPS load 520 are stable at 500 RPS. The zero-history RPS limit 830 is 750 RPS, as the RPS load 520 (i.e., 500) multiplied by the RPS increase ratio 824 (i.e., 1.5) is equal to 750 RPS. At roughly time 500 seconds, the RPS 510 increases instantaneously to 6000 RPS. After the time period associated with the RPS load duration 522 passes (e.g., 5 minutes), the RPS load 520 also arrives at 6000 RPS. However, in this example, the zero-history RPS limit 830 increases in intervals of the RPS delay 726. Due to the drastic increase in the RPS 510, the minimum between the RPS 510 and the previous zero-history RPS limit 830 is the previous zero-history RPS limit 830 until over 2000 seconds have passed.

In this example, the delta detector 310 would detect a delta violation 312 beginning at 500 seconds (i.e., when the traffic suddenly increased) with a duration of 5 minutes (i.e., the RPS load duration 522). In contrast, a zero-history violation 322, while beginning at the same point as the delta violation 312 (i.e., at approximately 500 seconds), has a length equivalent to the time period until the RPS 510 no longer exceeds the zero-history RPS limit 830 (i.e., at approximately 2300 seconds). Thus, in this example, the zero-history violation 322 is longer in duration than the corresponding delta violation 312. In some examples, a zero-history violation 322 corresponds to multiple delta violations 312, and thus a total number of zero-history violations 322 may be less than or equal to a total number of delta violations 312. For example, when there is a stepwise increase in traffic (i.e., RPS 510), the head of each step may be flagged as a delta violation 312, but the entire traffic spike may be detected as a single zero-history violation 332.

Because all zero-history violations 322 include a delta violation 312 at the head, prior detections of delta violations 312 (e.g., by the delta detector 310) greatly simplifies detection of corresponding zero-history violations 322. This process can also merge multiple delta-violations into a single zero-history violation.

Figure 9:
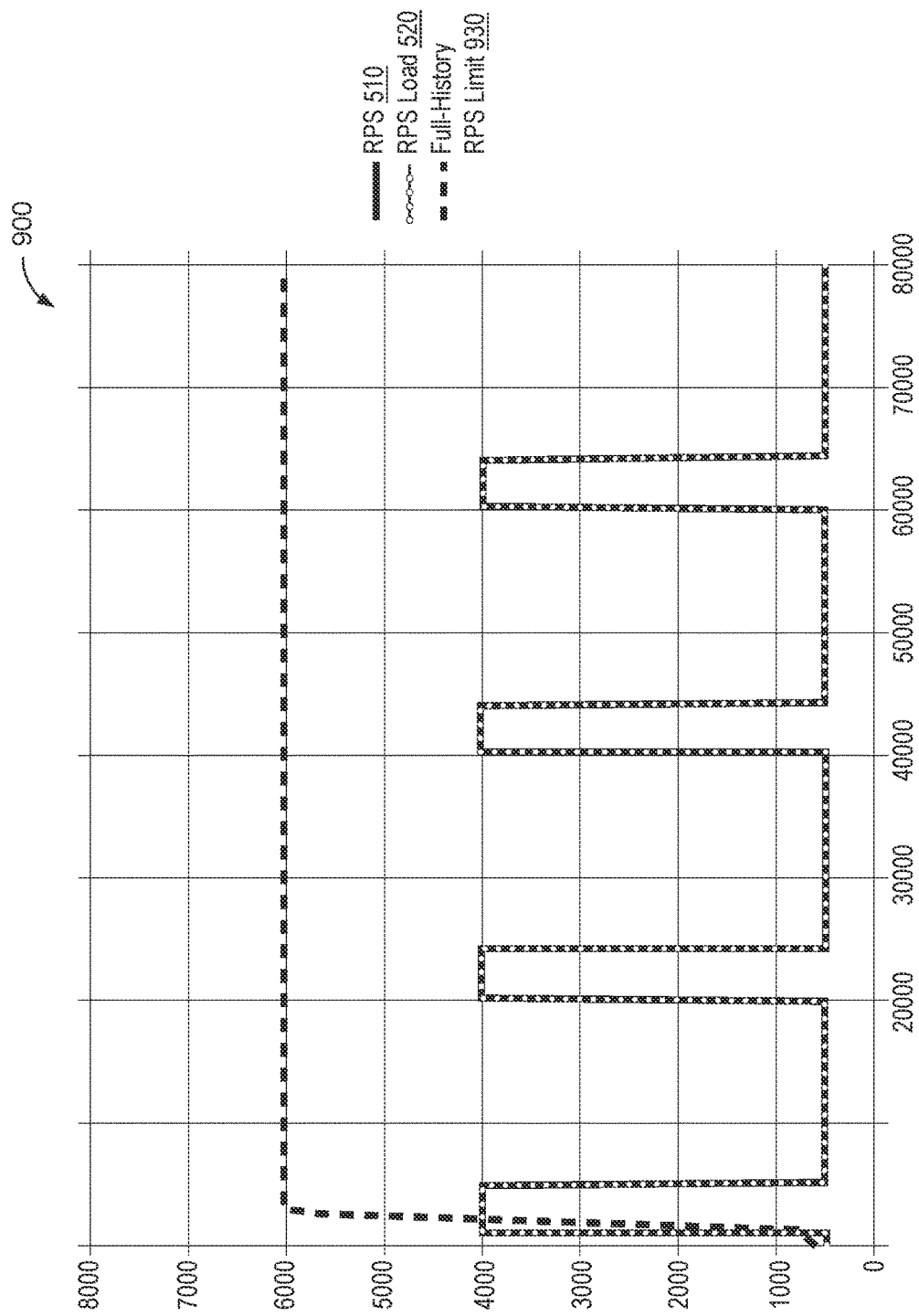
FIG. 9 is a schematic view of a plot of the RPS, the RPS load, and a full history RPS limit.

Referring again back to FIG. 3, the zero-history detector 320 sends the detected zero-history violations 322 to the full-history detector 330 along with any relevant information (e.g., timestamps, key-ranges, etc.). In some implementations, increasing the capacity of a key range (e.g., via adding a shard 152) in response to a traffic spike takes a relatively short period of time (e.g., 5 minutes), while the information retrieval system 150 may retain the increased capacity for a significant period of time (e.g., 1 day) even if the traffic immediately subsides to pre-spike levels. This behavior may be modeled by a full-history RPS limit 930 (FIG. 9). Using the full-history RPS limit 930, not all zero-history violations 322 will correspond to full-history violations 332, as the zero-history violations 322 do not account for the history of the entire reference window 404. The full-history RPS limit 930 may be referred to as a maximum conforming load for the key range. The maximum conforming load may be dependent upon implementation of autoscaling resources (i.e., splitting and merging shards). That is, a key-range capacity (i.e., the maximum conforming load for each key range) may be determined by the load variations where autoscaling allows for increasing level of load or a number of partitions that the respective key-range corresponds to due to the amount of data the key-range holds.

In some examples, a zero-history violation 322 includes multiple full-history violations 332. For example, a zero history violation 322 (from one or more delta violations 312) with the interval [zh_start, zh_end] has a traffic pattern for a select key-range that is generally increasing but is wavy and it has two intense maximums within the interval. Between the maximums, the traffic decreases and trends near the zero history limit 830 but does not equal it, which results in a single violation period for a zero-history violation 322. When determining full-history violations 332, each timestamp (e.g., at an interval of duration of the time-buckets 420) within the zero-history violation interval may be compared to the maximum conforming load within the current reference window 404, as each timestamp has a different reference window 404 that moves or slides with the timestamp. Depending on historical levels of load within these reference windows 404, areas around the two maximums may be derived as two separate full-history violation periods while the local minimum in between each maximum conforms to the maximum conforming load.

The full-history detector 330 detects full-history violations 332 which correspond to violations of the traffic ramp-up rule 302. A full-history violation 332 may correspond to a zero-history violation 322 that lacks prior levels of conforming workload within the corresponding reference window 404. More specifically, when examining a zero history violation period of [zh_start, zh_end], at any given timestamp is belonging to this period, a full history limit may be re-derived equal to the RPS increase ratio 824 multiplied by the maximum conforming load of the corresponding reference window 404. This new limit may be used to determine if this instance in time is a full history violation 332. In some examples, only a portion (e.g., the most intense of this interval may be processed as a heuristic. The full-history detector 330, in some examples, only processes regions corresponding to zero-history violations 322 in order to detect full-history violations 332. Because any historical dependency for a zero-history violation 322 resets as soon as traffic returns to below the zero-history RPS limit 830 and because of the extended increased capacity in response to increased traffic, a zero-history violation 322 may not account for some conforming workloads.

In some implementations, the full-history detector 330 also receives the grid 400. The high resolution grid 400 (e.g., generated by the delta detector 310) enables the full-history detector 330 to derive bounds for the previous levels of load for any key-range. Each zero-history violation 322 corresponds to a sudden increase in levels of traffic. When there are no comparable levels of non-violating (i.e., conforming) load in the reference window 404, the full-history detector 330 determines that a zero-history violation 322 is a full-history violation 332.

Referring now to FIG. 9, a plot 900 illustrates the relationship between the RPS 510, the RPS load 520, and the full-history RPS limit 930. As with the previous examples, the plot 900 has an x-axis of time in seconds and a y-axis in RPS. Here, four traffic spikes are illustrated that rapidly increase traffic from about 500 RPS to about 4000 RPS. Here, user traffic (i.e., RPS 510) is assumed stable for a long period of time prior to time=0 (e.g., for longer than the reference window 404 period). While all four spikes may be detected as delta violations 312 and zero-history violations 322, due to the maintained capacity increase (represented by the full-history RPS limit 930), the full-history detector 330 may determine that only the first spike is a full-history violation 332.

Figure 10:
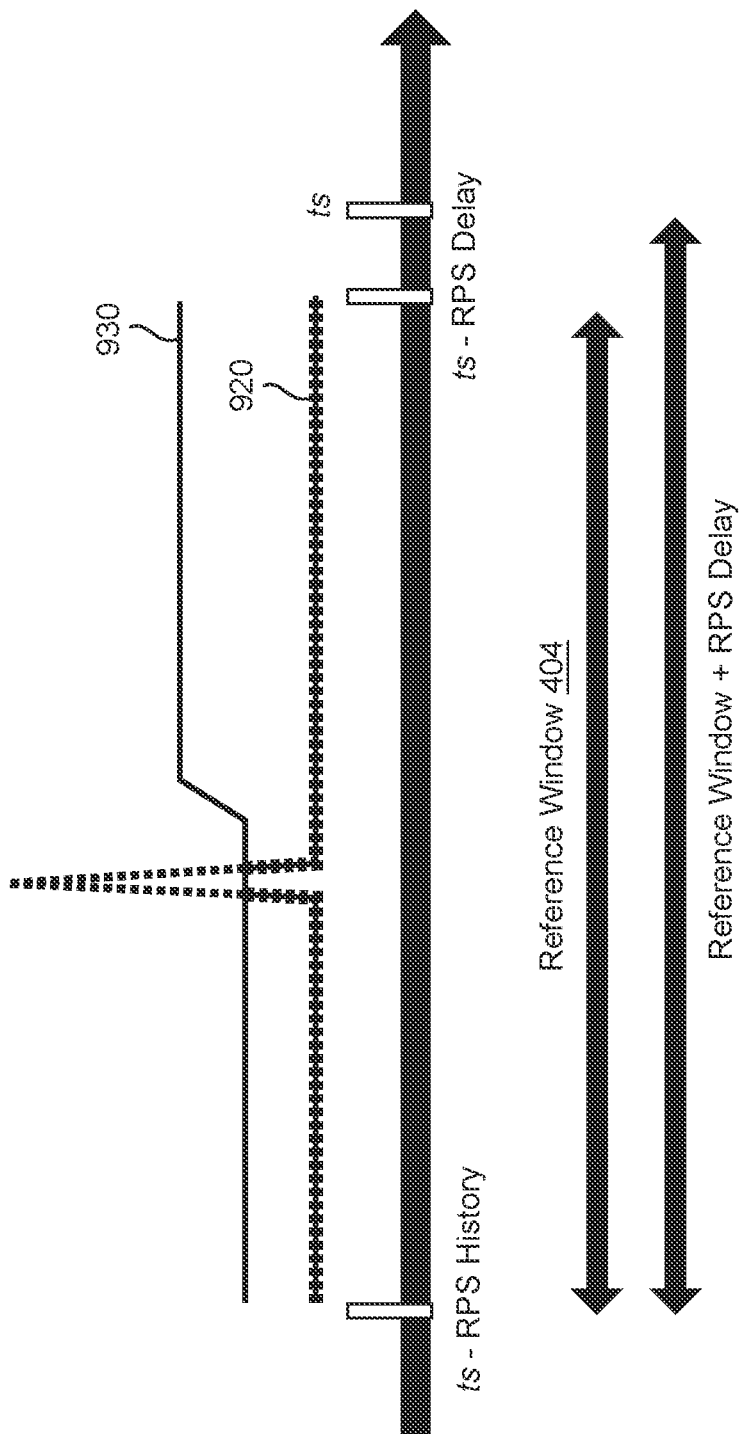
FIG. 10 is a schematic view of the relationship between a reference window, the RPS load, and the full-history RPS limit.

Referring now to FIG. 10, a primary challenge to detecting violations of the traffic ramp-up rule 302 (i.e., the full-history violations 332) is the unbounded historical dependency of the traffic ramp-up rule 302. That is, whether a violation has occurred at a specific time is dependent upon traffic behavior prior to the specific time. Clearly, this poses an issue in determining an initial full-history RPS limit 930 at the beginning of the reference window 404. In order to solve this historical dependency, the rule violation detector 300 may implement a bootstrapping technique. That is, prior to the rule violation detector 300 sampling sufficient data to satisfy the RPS history (e.g., when the rule violation detector 300 has been sampling data for less than 25 hours), the bootstrapping technique may be used to initialize the full-history RPS limit 930.

Due to the nature of the full-history RPS limit 930, when a given reference window 404 has no violation, then determining the full-history RPS limit 930 only requires RPS load 520 values (and not the history of the full-history RPS limit 930). Put another way, a reference window 404 without a violation may act as a "history reset" event such that history prior to the reference window is irrelevant.

Figure 11:
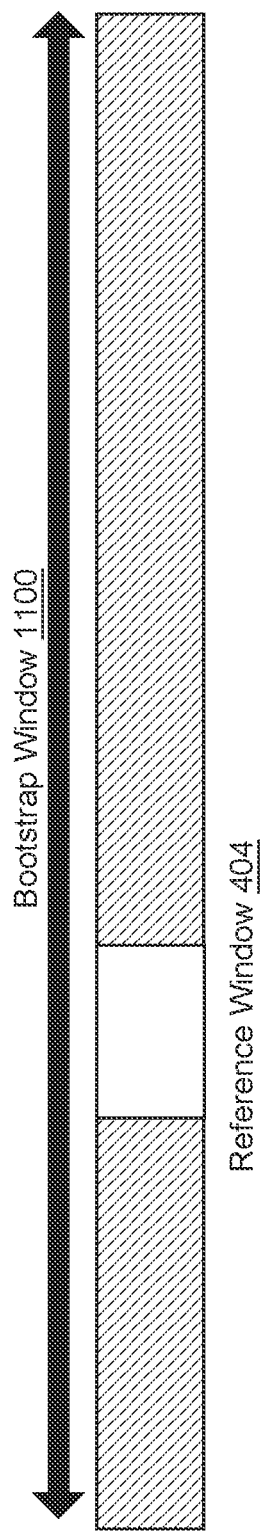
FIG. 11 is a schematic view of a bootstrap window for bootstrapping the full-history RPS limit.

Referring now to FIG. 11, in some implementations, the rule violation detector 300 selects a bootstrap window 1100 of sufficient size to ensure that there is a high probability that at least on reference window 404 with the bootstrap window 1100 has no full-history violation 332. The rule violation detector 300 may begin at the start of the bootstrap window 1100 and determine the full-history RPS limit 930 (using just the RPS load 520 to start). Because of the high probability that there was a reset event within the bootstrap window 1100, the rule violation detector 300 may trust the full-history RPS limit 930 at the end of the bootstrap window 1100. Thus, prior to the rule violation detector 300 detecting full-history violations 332 within a reference window 404, the rule violation detector 300 may bootstrap the full-history RPS limit 930 by selecting a bootstrap window 1100 prior in time to the reference window 404.

Figure 12:
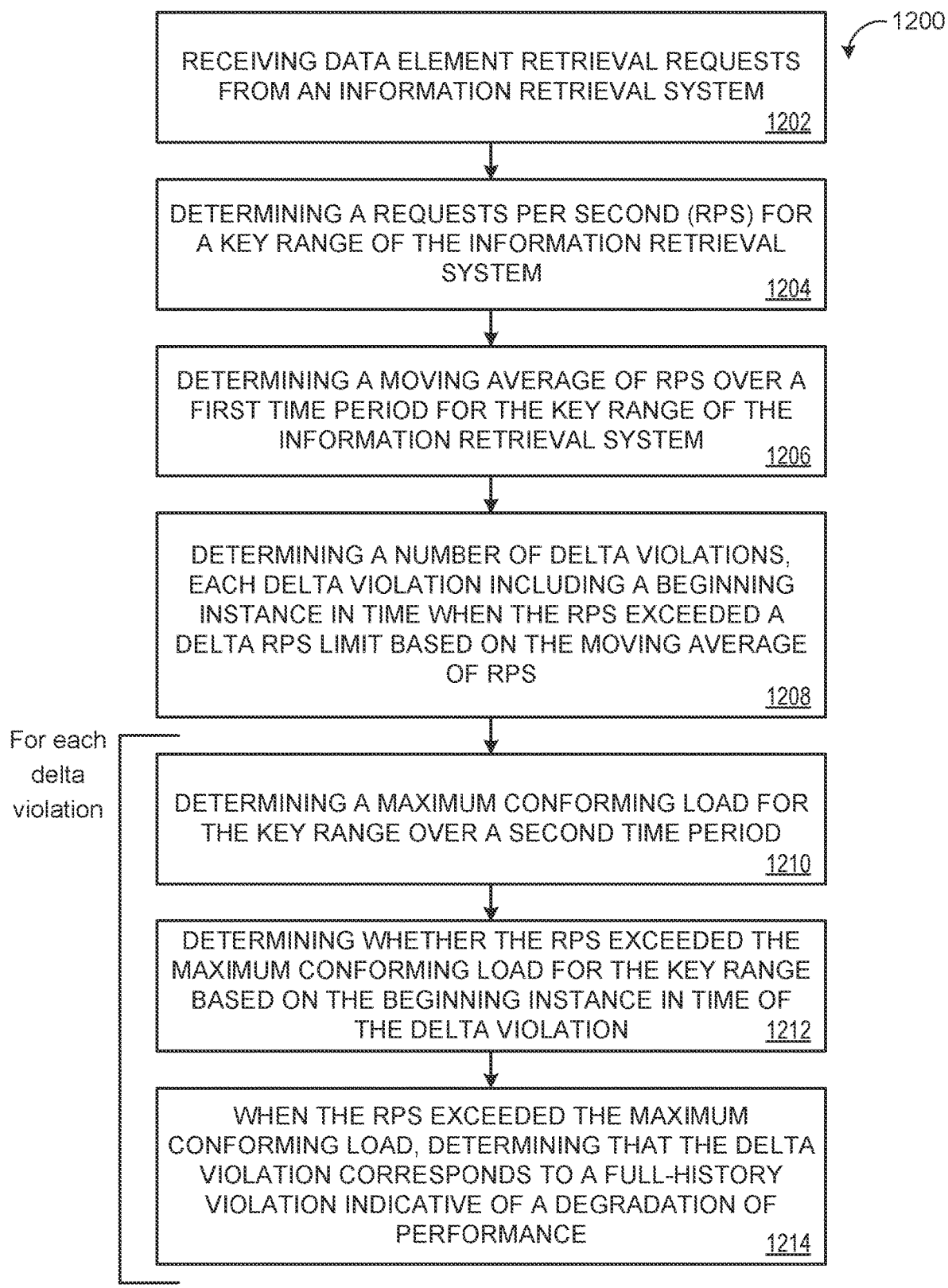
FIG. 12 is a flowchart of an example arrangement of operations for a method of detecting a violation of a traffic ramp-up rule.

FIG. 12 is a flowchart of an exemplary arrangement of operations for a method 1200 of detecting a traffic ramp-up rule violation within an information retrieval system. The method 1200 starts at operation 1202 with receiving, at data processing hardware 112, data element retrieval requests 105 each requesting at least one data element 202 from an information retrieval system 150. The information retrieval system 150 includes a plurality of data elements 202. The method 1200 includes, at operation 1204, determining, by the data processing hardware 112, a requests per second (RPS) 510 for a key range 430 of the information retrieval system 150 based on a number of the data element retrieval requests 105 received. At operation 1206, the method 1200 includes determining, by the data processing hardware 112, a moving average of RPS 520 for the key range 430 of the information retrieval system 150 over a first time period (e.g., RPS load duration of FIGS. 5-7) 522 based on the number of the data element retrieval requests 105 received. The method 1200, at operation 1208, includes determining, by the data processing hardware 112, a number of delta violations 312. Each delta violation 312 includes a respective beginning instance in time when the RPS 510 exceeded a delta RPS limit 530. The delta RPS limit 530 is based on the moving average of RPS 520.

For each delta violation 312, the method 1200 includes, at operation 1210, determining, by the data processing hardware 112, a maximum conforming load 930 for the key range 430 over a second time period 404 and, at operation 1212, determining, by the data processing hardware 112, whether the RPS 510 exceeded the maximum conforming load 930 for the key range 430 based on the beginning instance in time of the respective delta violation 312. When the RPS 510 exceeded the maximum conforming load 930 for the key range 430, the method 1200 includes, at operation 1214, determining, by the data processing hardware 112, that the delta violation 312 corresponds to a full-history violation 332. The full-history violation 332 is indicative of a degradation of performance of the information retrieval system 150.

Figure 13:
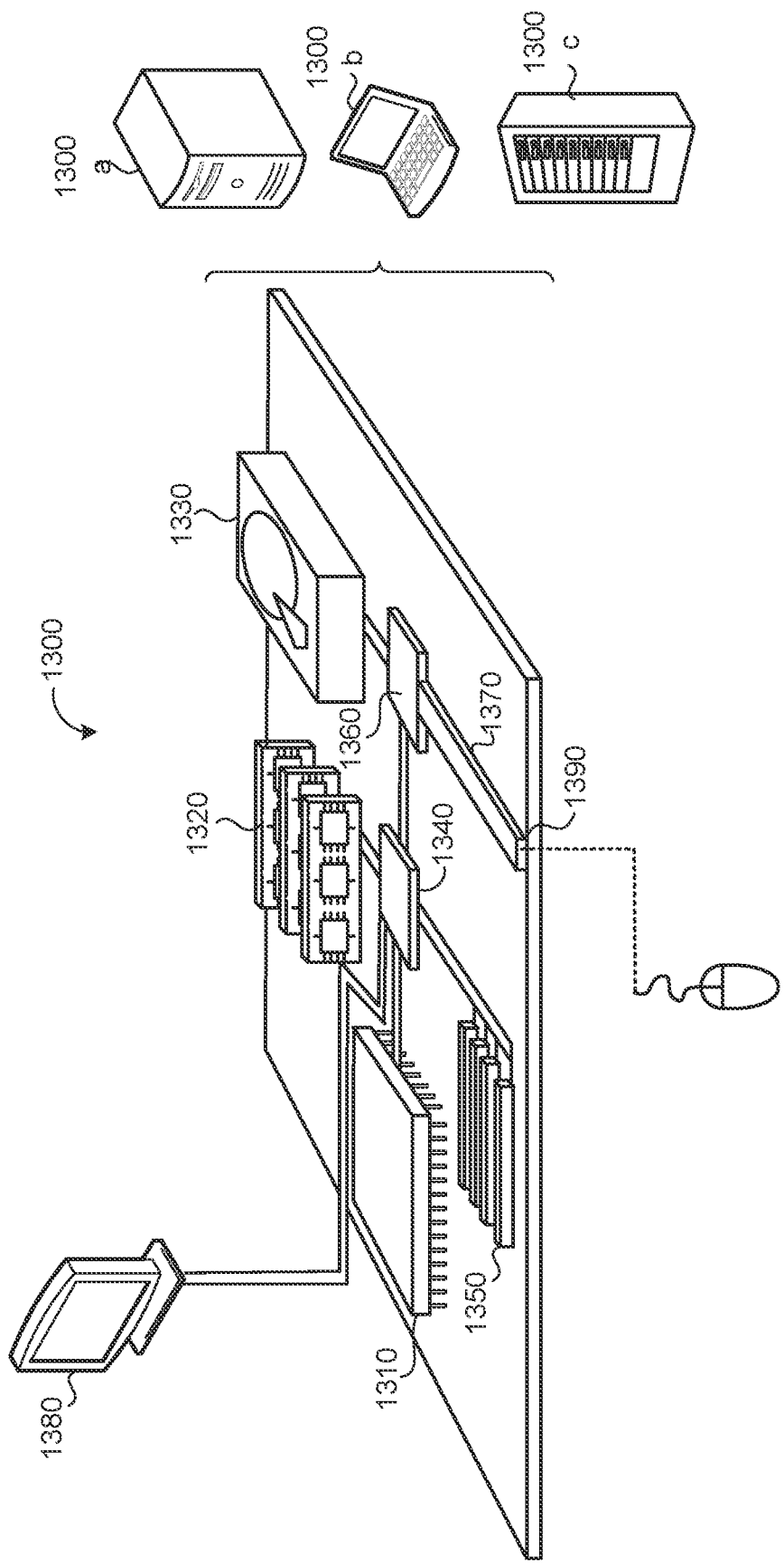
FIG. 13 is a schematic view of an example computing device that may be used to implement the systems and methods described herein.

FIG. 13 is schematic view of an example computing device 1300 that may be used to implement the systems and methods described in this document. The computing device 1300 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1300 includes a processor 1310, memory 1320, a storage device 1330, a high-speed interface/controller 1340 connecting to the memory 1320 and high-speed expansion ports 1350, and a low speed interface/controller 1360 connecting to a low speed bus 1370 and a storage device 1330. Each of the components 1310, 1320, 1330, 1340, 1350, and 1360, are interconnected using various busses, and may be mounted on a common motherboard or in other manners as appropriate. The processor 1310 can process instructions for execution within the computing device 1300, including instructions stored in the memory 1320 or on the storage device 1330 to display graphical information for a graphical user interface (GUI) on an external input/output device, such as display 1380 coupled to high speed interface 1340. In other implementations, multiple processors and/or multiple buses may be used, as appropriate, along with multiple memories and types of memory. Also, multiple computing devices 1300 may be connected, with each device providing portions of the necessary operations (e.g., as a server bank, a group of blade servers, or a multi-processor system).

The memory 1320 stores information non-transitorily within the computing device 1300. The memory 1320 may be a computer-readable medium, a volatile memory unit(s), or non-volatile memory unit(s). The non-transitory memory 1320 may be physical devices used to store programs (e.g., sequences of instructions) or data (e.g., program state information) on a temporary or permanent basis for use by the computing device 1300. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1330 is capable of providing mass storage for the computing device 1300. In some implementations, the storage device 1330 is a computer-readable medium. In various different implementations, the storage device 1330 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1320, the storage device 1330, or memory on processor 1310.

The high speed controller 1340 manages bandwidth-intensive operations for the computing device 1300, while the low speed controller 1360 manages lower bandwidth-intensive operations. Such allocation of duties is exemplary only. In some implementations, the high-speed controller 1340 is coupled to the memory 1320, the display 1380 (e.g., through a graphics processor or accelerator), and to the high-speed expansion ports 1350, which may accept various expansion cards (not shown). In some implementations, the low-speed controller 1360 is coupled to the storage device 1330 and a low-speed expansion port 1390. The low-speed expansion port 1390, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1300 may be implemented in a number of different forms, as shown in the figure. For example, it may be implemented as a standard server 1300*a* or multiple times in a group of such servers 1300*a*, as a laptop computer 1300*b*, or as part of a rack server system 1300*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
   receiving a plurality of data element retrieval requests, each data element retrieval request of the plurality of data element retrieval requests requesting at least one data element from an information retrieval system, the information retrieval system comprising a plurality of data elements;
   generating, for the information retrieval system, a request grid comprising a plurality of cells, each cell of the plurality of cells representing a respective time bucket of a respective key bucket, each respective key bucket comprising a respective range of keys of the information retrieval system;
   for each respective key bucket of the request grid:
      determining a respective requests per second (RPS) for the respective range of keys of the respective key bucket based on the plurality of data element retrieval requests received;
      determining a respective RPS load comprising a moving average of a number of data element retrieval requests corresponding to the respective range of keys of the respective key bucket over a duration of time; and
      determining a respective delta RPS limit based on the respective RPS load; and
   for one key bucket:
      determining that the respective RPS of the one key bucket exceeds the respective delta RPS limit of the one key bucket; and
      based on determining that the respective RPS of the one key bucket exceeds the respective delta RPS limit of the one key bucket, determining a delta violation indicative of a potential degradation of performance of the information retrieval system.

2. The method of claim 1, wherein the delta violation comprises a beginning instance in time corresponding to a time when the respective RPS exceeded the respective delta RPS limit.

3. The method of claim 2, wherein the operations further comprise, for the delta violation:
   determining a maximum conforming load for the one key bucket over a second duration of time;
   determining that the respective RPS exceeded the maximum conforming load for the one key bucket based on the beginning instance in time of the delta violation; and
   in response to determining that the respective RPS exceeded the maximum conforming load for the one key bucket, determining that the delta violation corresponds to a full-history violation, the full-history violation indicative of a degradation of performance of the information retrieval system.

4. The method of claim 3, wherein determining whether the respective RPS exceeded the maximum conforming load for the one key bucket based on the beginning instance in time of the delta violation comprises:
   determining a zero-history RPS limit, the zero-history RPS limit comprising a function of a minimum of a historical zero-history RPS limit and the respective RPS load;
   determining a third duration of time beginning at the beginning instance of the delta violation and ending when the respective RPS no longer exceeds the zero-history RPS limit;
   determining a zero-history violation based on the duration of time that the respective RPS exceeded the zero-history RPS limit; and
   in response to determining that the respective RPS exceeded the maximum conforming load for the one key bucket, determining that the zero-history violation corresponds to a full-history violation.

5. The method of claim 3, wherein determining the maximum conforming load comprises determining the maximum conforming load as a function of a number of data element retrieval requests previously received during a threshold window of time.

6. The method of claim 3, wherein the operations further comprise:
   selecting a time window encompassing a period of time prior to the second duration of time; and
   determining the maximum conforming load for the one key bucket during the time window.

7. The method of claim 1, wherein each key bucket is sized to represent a select average amount of data element retrieval requests.

8. The method of claim 1, wherein the information retrieval system comprises a dynamic range-sharded information retrieval system.

9. The method of claim 1, wherein determining respective delta RPS limit for each respective key bucket of the request grid comprises determining the respective delta RPS limit based on the respective RPS load and a delta weight indicating a model capacity increase after a split operation.

10. The method of claim 9, wherein the split operation comprises increasing a memory available to the respective key bucket.

11. A system comprising:
    data processing hardware; and
    memory hardware in communication with the data processing hardware, the memory hardware storing instructions that when executed on the data processing hardware cause the data processing hardware to perform operations comprising:
       receiving a plurality of data element retrieval requests, each data element retrieval request of the plurality of data element retrieval requests requesting at least one data element from an information retrieval system, the information retrieval system comprising a plurality of data elements;
       generating, for the information retrieval system, a request grid comprising a plurality of cells, each cell of the plurality of cells representing a respective time bucket of a respective key bucket, each respective key bucket comprising a respective range of keys of the information retrieval system;
       for each respective key bucket of the request grid:
          determining a respective requests per second (RPS) for the respective range of keys of the respective key bucket based on the plurality of data element retrieval requests received;
          determining a respective RPS load comprising a moving average of a number of data element retrieval requests corresponding to the respective range of keys of the respective key bucket over a duration of time; and
          determining a respective delta RPS limit based on the respective RPS load; and
       for one key bucket:
          determining that the respective RPS of the one key bucket exceeds the respective delta RPS limit of the one key bucket; and
          based on determining that the respective RPS of the one key bucket exceeds the respective delta RPS limit of the one key bucket, determining a delta violation indicative of a potential degradation of performance of the information retrieval system.

12. The system of claim 11, wherein the delta violation comprises a beginning instance in time corresponding to a time when the respective RPS exceeded the respective delta RPS limit.

13. The system of claim 12, wherein the operations further comprise, for the delta violation:
    determining a maximum conforming load for the one key bucket over a second duration of time;
    determining that the respective RPS exceeded the maximum conforming load for the one key bucket based on the beginning instance in time of the delta violation; and
    in response to determining that the respective RPS exceeded the maximum conforming load for the one key bucket, determining that the delta violation corresponds to a full-history violation, the full-history violation indicative of a degradation of performance of the information retrieval system.

14. The system of claim 13, wherein determining whether the respective RPS exceeded the maximum conforming load for the one key bucket based on the beginning instance in time of the delta violation comprises:
    determining a zero-history RPS limit, the zero-history RPS limit comprising a function of a minimum of a historical zero-history RPS limit and the respective RPS load;
    determining a third duration of time beginning at the beginning instance of the delta violation and ending when the respective RPS no longer exceeds the zero-history RPS limit;
    determining a zero-history violation based on the duration of time that the respective RPS exceeded the zero-history RPS limit; and
    in response to determining that the respective RPS exceeded the maximum conforming load for the one key bucket, determining that the zero-history violation corresponds to a full-history violation.

15. The system of claim 13, wherein determining the maximum conforming load comprises determining the maximum conforming load as a function of a number of data element retrieval requests previously received during a threshold window of time.

16. The system of claim 13, wherein the operations further comprise:
    selecting a time window encompassing a period of time prior to the second duration of time; and
    determining the maximum conforming load for the one key bucket during the time window.

17. The system of claim 11, wherein each key bucket is sized to represent a select average amount of data element retrieval requests.

18. The system of claim 11, wherein the information retrieval system comprises a dynamic range-sharded information retrieval system.

19. The system of claim 11, wherein determining respective delta RPS limit for each respective key bucket of the request grid comprises determining the respective delta RPS limit based on the respective RPS load and a delta weight indicating a model capacity increase after a split operation.

20. The system of claim 19, wherein the split operation comprises increasing a memory available to the respective key bucket.

* * * * *